United States Patent
Roziere

(10) Patent No.: US 10,156,941 B2
(45) Date of Patent: Dec. 18, 2018

(54) METHOD AND DEVICE FOR NAVIGATING IN A DISPLAY SCREEN AND APPARATUS COMPRISING SUCH NAVIGATION

(71) Applicant: QUICKSTEP TECHNOLOGIES LLC, Wilmington, DE (US)

(72) Inventor: Didier Roziere, Nimes (FR)

(73) Assignee: Quickstep Technologies LLC, Wilmington, DE (US)

( * ) Notice: Subject to any disclaimer, the term of this patent is extended or adjusted under 35 U.S.C. 154(b) by 0 days.

(21) Appl. No.: 14/767,238

(22) PCT Filed: Feb. 10, 2014

(86) PCT No.: PCT/EP2014/052533
§ 371 (c)(1),
(2) Date: Aug. 11, 2015

(87) PCT Pub. No.: WO2014/124897
PCT Pub. Date: Aug. 21, 2014

(65) Prior Publication Data
US 2016/0004348 A1    Jan. 7, 2016

(30) Foreign Application Priority Data
Feb. 14, 2013 (FR) ..................... 13 51275

(51) Int. Cl.
*G06F 3/0488* (2013.01)
*G06F 3/044* (2006.01)
(Continued)

(52) U.S. Cl.
CPC .............. *G06F 3/044* (2013.01); *G06F 3/041* (2013.01); *G06F 3/042* (2013.01); *G06F 3/0416* (2013.01);
(Continued)

(58) Field of Classification Search
CPC ..................... G06F 3/041; G06F 3/044; G06F 2203/04101; G06F 3/0488
See application file for complete search history.

(56) References Cited

U.S. PATENT DOCUMENTS 5,103,085 A    4/1992 Zimmerman
5,270,818 A    12/1993 Ottenstein
(Continued)

FOREIGN PATENT DOCUMENTS

CA       1243096 A     10/1988
CN     101547253 A      9/2009
(Continued)

OTHER PUBLICATIONS

International Search Report for International Application PCT/EP2014/052533, dated May 9, 2014.
(Continued)

*Primary Examiner* — Dennis Joseph
(74) *Attorney, Agent, or Firm* — Morrison & Foerster LLP

(57) ABSTRACT

A method is provided for navigating in a display screen by way of a control surface including a step of measuring:—a data item, termed position, relating to a position targeted, on the control surface, by a remote control object positioned opposite the control surface, and—a data item, termed vertical distance, relating to the distance between the at least one remote control object and the control surface; and a drive step, carrying out, as a function of the vertical distance measured:—a displacement, and/or—an adjustment of a parameter relating to a displacement; of at least one part of a zone and/or of a symbol displayed on the display screen and chosen as a function of the target position.

25 Claims, 4 Drawing Sheets

(51) Int. Cl.
*G06F 3/041* (2006.01)
*G06F 3/042* (2006.01)
*G06F 3/0485* (2013.01)

(52) U.S. Cl.
CPC .......... *G06F 3/0485* (2013.01); *G06F 3/0488* (2013.01); *G06F 3/04883* (2013.01); *G06F 2203/04101* (2013.01); *G06F 2203/04108* (2013.01); *G06F 2203/04806* (2013.01)

(56) References Cited

U.S. PATENT DOCUMENTS

| | | |
|---|---|---|
| 5,345,550 A | 9/1994 | Bloomfield |
| 5,347,295 A | 9/1994 | Agulnick et al. |
| 5,363,051 A | 11/1994 | Jenstrom et al. |
| 5,406,305 A | 4/1995 | Shimomura et al. |
| 5,483,261 A | 1/1996 | Yasutake |
| 5,488,204 A | 1/1996 | Mead et al. |
| 5,528,266 A | 6/1996 | Arbeitman et al. |
| 5,684,294 A | 11/1997 | Kouhi |
| 5,825,352 A | 10/1998 | Bisset et al. |
| 5,835,079 A | 11/1998 | Shieh |
| 5,844,506 A | 12/1998 | Binstead |
| 5,880,411 A | 3/1999 | Gillespie et al. |
| 5,952,992 A | 9/1999 | Helms |
| 5,956,291 A | 9/1999 | Nehemiah et al. |
| 6,073,036 A | 6/2000 | Heikkinen et al. |
| 6,105,419 A | 8/2000 | Michels et al. |
| 6,188,391 B1 | 2/2001 | Seely et al. |
| 6,308,144 B1 | 10/2001 | Bronfield et al. |
| 6,310,610 B1 | 10/2001 | Beaton et al. |
| 6,313,853 B1 | 11/2001 | Lamontagne et al. |
| 6,323,846 B1 | 11/2001 | Westerman et al. |
| 6,373,612 B1 | 4/2002 | Hoffman et al. |
| 6,414,674 B1 | 7/2002 | Kamper et al. |
| 6,480,188 B1 | 11/2002 | Horsley |
| 6,520,013 B1 | 2/2003 | Wehrenberq |
| 6,583,676 B2 | 6/2003 | Krah et al. |
| 6,601,012 B1 | 7/2003 | Horvitz et al. |
| 6,661,920 B1 | 12/2003 | Skinner |
| 6,664,744 B2 | 12/2003 | Dietz |
| 6,680,677 B1 | 1/2004 | Tiphane |
| 6,690,275 B2 | 2/2004 | Long et al. |
| 6,690,387 B2 | 2/2004 | Zimmerman et al. |
| 6,812,466 B2 | 11/2004 | O'Connor et al. |
| 6,822,635 B2 | 11/2004 | Shahoian et al. |
| 6,847,354 B2 | 1/2005 | Vranish |
| 6,903,730 B2 | 6/2005 | Mathews et al. |
| 6,920,619 B1 | 7/2005 | Milekic |
| 6,947,571 B1 | 9/2005 | Rhoads et al. |
| 6,956,564 B1 | 10/2005 | Williams |
| 6,961,912 B2 | 11/2005 | Aoki et al. |
| 7,015,894 B2 | 3/2006 | Morohoshi |
| 7,016,705 B2 | 3/2006 | Bahl et al. |
| 7,019,622 B2 | 3/2006 | Orr et al. |
| 7,058,902 B2 | 6/2006 | Iwema et al. |
| 7,151,528 B2 | 12/2006 | Taylor et al. |
| 7,171,221 B1 | 1/2007 | Amin et al. |
| 7,184,064 B2 | 2/2007 | Zimmerman et al. |
| 7,319,454 B2 | 1/2008 | Thacker et al. |
| 7,522,065 B2 | 4/2009 | Falcon |
| RE40,867 E | 8/2009 | Binstead |
| 7,570,064 B2 | 8/2009 | Roziere |
| 7,593,552 B2 | 9/2009 | Higaki |
| 7,633,076 B2 | 12/2009 | Huppi et al. |
| 7,653,883 B2 | 1/2010 | Hotelling et al. |
| 7,663,607 B2 | 2/2010 | Hotelling et al. |
| 7,743,348 B2 | 6/2010 | Robbins et al. |
| 8,149,002 B2 | 4/2012 | Ossart et al. |
| 8,159,213 B2 | 4/2012 | Roziere |
| 8,381,135 B2 | 2/2013 | Hotelling et al. |
| 8,479,122 B2 | 7/2013 | Hotelling et al. |
| 8,612,856 B2 | 12/2013 | Hotelling et al. |
| 8,770,033 B2 | 7/2014 | Roziere |
| 8,917,256 B2 | 12/2014 | Roziere |
| 9,035,903 B2 | 5/2015 | Binstead |
| 2001/0015718 A1 | 8/2001 | Hinckley et al. |
| 2001/0031633 A1 | 10/2001 | Tuomela et al. |
| 2001/0035858 A1 | 11/2001 | Blumberg |
| 2002/0057260 A1 | 5/2002 | Mathews et al. |
| 2002/0140633 A1 | 10/2002 | Rafii et al. |
| 2002/0167488 A1 | 11/2002 | Hinckley et al. |
| 2003/0001899 A1 | 1/2003 | Partanen et al. |
| 2003/0016253 A1 | 1/2003 | Aoki et al. |
| 2003/0076363 A1 | 4/2003 | Murphy |
| 2003/0095096 A1 | 5/2003 | Robbin et al. |
| 2003/0132922 A1 | 7/2003 | Philipp |
| 2003/0160808 A1 | 8/2003 | Foote et al. |
| 2003/0179201 A1 | 9/2003 | Thacker |
| 2004/0145601 A1 | 7/2004 | Brielmann et al. |
| 2004/0150668 A1 | 8/2004 | Myers et al. |
| 2004/0150669 A1 | 8/2004 | Sabiers et al. |
| 2004/0224638 A1 | 11/2004 | Fadell et al. |
| 2004/0233153 A1 | 11/2004 | Robinson |
| 2004/0245438 A1 | 12/2004 | Payne et al. |
| 2005/0015731 A1 | 1/2005 | Mak et al. |
| 2005/0057524 A1 | 3/2005 | Hill et al. |
| 2005/0134578 A1 | 6/2005 | Chambers et al. |
| 2005/0190142 A1 | 9/2005 | Ferguson |
| 2005/0219223 A1 | 10/2005 | Kotzin et al. |
| 2005/0219228 A1 | 10/2005 | Alameh et al. |
| 2005/0219394 A1 | 10/2005 | Du et al. |
| 2005/0221791 A1 | 10/2005 | Angelhag |
| 2005/0223308 A1 | 10/2005 | Gunn et al. |
| 2006/0010400 A1 | 1/2006 | Dehlin et al. |
| 2006/0012577 A1 | 1/2006 | Kyrola |
| 2006/0017692 A1 | 1/2006 | Wehrenberq et al. |
| 2006/0026521 A1 | 2/2006 | Hotelling et al. |
| 2006/0026535 A1 | 2/2006 | Hotelling et al. |
| 2006/0097733 A1 | 5/2006 | Roziere |
| 2006/0117108 A1 | 6/2006 | Salisbury et al. |
| 2006/0146012 A1 | 7/2006 | Arneson et al. |
| 2006/0161870 A1 | 7/2006 | Hotelling et al. |
| 2006/0161871 A1 | 7/2006 | Hotelling et al. |
| 2006/0164241 A1 | 7/2006 | Makela et al. |
| 2006/0197753 A1 | 9/2006 | Hotelling |
| 2006/0244735 A1 | 11/2006 | Wilson |
| 2006/0279548 A1 | 12/2006 | Geaghan |
| 2006/0290921 A1 | 12/2006 | Hotelling et al. |
| 2007/0085157 A1 | 4/2007 | Fadell et al. |
| 2007/0099574 A1 | 5/2007 | Wang |
| 2007/0216659 A1* | 9/2007 | Amineh ............... G06F 3/0236 345/173 |
| 2007/0277123 A1 | 11/2007 | Shin et al. |
| 2008/0006762 A1 | 1/2008 | Fadell et al. |
| 2008/0090617 A1 | 4/2008 | Sutardia |
| 2008/0113618 A1 | 5/2008 | De Leon et al. |
| 2008/0278450 A1 | 11/2008 | Lashina |
| 2008/0284261 A1 | 11/2008 | Andrieux et al. |
| 2008/0307360 A1 | 12/2008 | Chaudhri et al. |
| 2008/0309632 A1 | 12/2008 | Westerman et al. |
| 2009/0128498 A1 | 5/2009 | Hollemans et al. |
| 2009/0265670 A1 | 10/2009 | Kim et al. |
| 2009/0289914 A1* | 11/2009 | Cho ..................... G06F 3/044 345/173 |
| 2009/0295715 A1 | 12/2009 | Seo et al. |
| 2009/0315858 A1 | 12/2009 | Sato et al. |
| 2009/0327969 A1 | 12/2009 | Estrada |
| 2010/0052700 A1 | 3/2010 | Yano et al. |
| 2010/0060599 A1 | 3/2010 | Kwak et al. |
| 2010/0123667 A1 | 5/2010 | Kim et al. |
| 2010/0265204 A1 | 10/2010 | Tsuda |
| 2011/0041096 A1 | 2/2011 | Larco et al. |
| 2011/0128244 A1 | 6/2011 | Cho et al. |
| 2011/0164063 A1 | 7/2011 | Shimotani et al. |
| 2011/0169783 A1 | 7/2011 | Wang et al. |
| 2011/0179368 A1 | 7/2011 | King et al. |
| 2011/0221776 A1 | 9/2011 | Shimotani et al. |
| 2011/0248963 A1 | 10/2011 | Lawrence et al. |
| 2012/0026113 A1 | 2/2012 | Kasahara et al. |
| 2012/0044662 A1 | 2/2012 | Kim et al. |
| 2012/0187965 A1 | 7/2012 | Roziere |
| 2012/0188200 A1 | 7/2012 | Roziere |

(56) References Cited

U.S. PATENT DOCUMENTS

| | | | | |
|---|---|---|---|---|
| 2012/0270533 | A1* | 10/2012 | You | G06F 3/0416 455/420 |
| 2013/0135247 | A1 | 5/2013 | Na et al. | |
| 2013/0307776 | A1 | 11/2013 | Roziere | |
| 2014/0074426 | A1 | 3/2014 | Hotelling | |
| 2014/0132335 | A1 | 5/2014 | Rauhala et al. | |
| 2015/0035792 | A1 | 2/2015 | Roziere et al. | |
| 2016/0179247 | A1 | 6/2016 | Blondin | |

FOREIGN PATENT DOCUMENTS

| | | |
|---|---|---|
| DE | 10042300 A1 | 3/2002 |
| DE | 10059906 A1 | 6/2002 |
| DE | 10251296 A1 | 5/2004 |
| EP | 0 462 759 A2 | 12/1991 |
| EP | 0 464 908 A2 | 1/1992 |
| EP | 0 288 692 B1 | 7/1993 |
| EP | 0 664 504 A2 | 7/1995 |
| EP | 0 992 969 A1 | 4/2000 |
| EP | 1 014 295 A3 | 1/2002 |
| EP | 1 185 058 A2 | 3/2002 |
| EP | 1 335 430 A1 | 8/2003 |
| EP | 1 355 223 A2 | 10/2003 |
| EP | 1 452 988 A1 | 9/2004 |
| EP | 1 507 132 A1 | 2/2005 |
| EP | 1 507 196 A2 | 2/2005 |
| EP | 1 569 079 A1 | 8/2005 |
| EP | 1 696 414 A1 | 8/2006 |
| EP | 2 105 844 A2 | 9/2009 |
| EP | 2104024 | 9/2009 |
| EP | 2 166 463 A1 | 3/2010 |
| EP | 2 267 791 A2 | 10/2010 |
| EP | 2426581 | 3/2012 |
| EP | 2 634 687 A2 | 9/2013 |
| GB | 2330670 A | 4/1999 |
| GB | 2418808 A | 4/2006 |
| JP | 63-167923 A | 7/1988 |
| JP | 06-161661 A | 6/1994 |
| JP | 2000-163031 A | 6/2000 |
| JP | 2002-342033 A | 11/2002 |
| KR | 2011-0029681 A | 3/2011 |
| WO | WO-97/18547 A1 | 5/1997 |
| WO | WO-97/23738 A1 | 7/1997 |
| WO | WO-98/14863 A2 | 4/1998 |
| WO | WO-99/28813 A1 | 6/1999 |
| WO | WO-00/38042 A1 | 6/2000 |
| WO | WO-2004/093045 A1 | 10/2004 |
| WO | WO-2006/003590 A2 | 1/2006 |
| WO | WO-2006/003590 A3 | 1/2006 |
| WO | WO-2006/023569 A1 | 3/2006 |
| WO | WO-2006/026012 A2 | 3/2006 |
| WO | WO-2009/028892 A2 | 3/2009 |
| WO | 2015007781 | 1/2015 |

OTHER PUBLICATIONS

Final Office Action dated Oct. 15, 2015, for U.S. Appl. No. 13/982,791, filed Jul. 31, 2013, 16 pages.
Lee, S.K. et al. (Apr. 1985). "A Multi-Touch Three Dimensional Touch-Sensitive Tablet," *Proceedings of CHI: ACM Conference on Human Factors in Computing Systems*, pp. 21-25.
Non-Final Office Action dated Mar. 25, 2015, for U.S. Appl. No. 13/982,791, filed Jul. 31, 2013, 17 pages.
Non-Final Office Action dated Apr. 22, 2016, for U.S. Appl. No. 13/982,791, filed Jul. 31, 2013, 15 pages.
Rubine, D.H. (Dec. 1991). "The Automatic Recognition of Gestures," CMU-CS-91-202, Submitted in Partial Fulfillment of the Requirements for the Degree of Doctor of Philosophy in Computer Science at Carnegie Mellon University, 285 pages.
Rubine, D.H. (May 1992). "Combining Gestures and Direct Manipulation," CHI ' 92, pp. 659-660.
Westerman, W. (Spring 1999). "Hand Tracking, Finger Identification, and Chordic Manipulation on a Multi-Touch Surface," A Dissertation Submitted to the Faculty of the University of Delaware in Partial Fulfillment of the Requirements for the Degree of Doctor of Philosophy in Electrical Engineering, 364 pages.
Final Office Action dated Jan. 20, 2017, for U.S. Appl. No. 13/982,791, filed Jul. 31, 2013, 14 pages.
Agilent Technologies Inc., "Agilent unveils optical proximity sensor for mobile appliances", http://www.embeddedstar.com/press/content/2004/8/embedded16015.html, (Aug. 31, 2004), 2 pages.
Anonymous. (2005). "Gesture Recognition," located at <http://www.fingerworks.com/gesture_recognition.html>, last visited Aug. 30, 2005.
Anonymous. (2005). "Touch Technologies: Touch is Everywhere," located at http://www.3m.com/3MTouchSystems/downloads/PDFs/TouchTechOV.pdf., last visited Aug. 30, 2005.
Anonymous. "4-Wire Resistive Touchscreens" obtained from http://www.touchscreens.com/intro-touchtypes-4resistive.html generated Aug. 5, 2005.
Anonymous. "5-Wire Resistive Touchscreens" obtained from http://www.touchscreens.com/intro-touchtypes-resistive.html, generated Aug. 5, 2005.
Anonymous. "A Brief Overview of Gesture Recognition" obtained from http://www. Dai. Ed.Ac.uk/Cvonline/LOCAL_COPIES/COHEN/gesture_overview. Html, generated Apr. 20, 2004.
Anonymous. "Ai Squared Products—XoomText Magnifier," http://www/aisquared.com/Products/zoomtexturemag/index.cfm, downloaded Oct. 26, 2005.
Anonymous. "Capacitive Position Sensing" obtained from http://www.synaptics.com/technology/cps.cfin generated Aug. 5, 2005.
Anonymous. "Capacitive Touchscreens" obtained from http://www.touchscreens.com/intro- touchtypes-capacitive.html generated Aug. 5, 2005.
Anonymous. "Comparing Touch Technologies" obtained from http://www.touchscreens.com/intro-touchtypes.html generated Oct. 10, 2004.
Anonymous. "FingerWorks—Gesture Guide—Application Switching," obtained from http://www.fingerworks.com/gesture_guide_apps.html, generated on Aug. 27, 2004, 1-pg.
Anonymous. "FingerWorks—Gesture Guide—Editing," obtained from http://www.fingerworks.com/gesure_guide_editing.html, generated on Aug. 27, 2004, 1-pg.
Anonymous. "FingerWorks—Gesture Guide—File Operations," obtained from http://www.fingerworks.com/gesture_guide_files.html, generated on Aug. 27, 2004, 1-pg.
Anonymous. "FingerWorks—Gesture Guide—Text Manipulation," obtained from http://www.fingerworks.com/gesture_guide_text_manip. html, generated on Aug. 27, 2004, 2-pg.
Anonymous. "FingerWorks—Gesture Guide—Tips and Tricks," obtained from http://www.fingerworks.com/gesture_guide_tips.html, generated Aug. 27, 2004, 2-pgs.
Anonymous. "FingerWorks—Gesture Guide—Web," obtained from http://www.fingerworks.com/gesture_guide_web.html, generated on Aug. 27, 2004, 1-pg.
Anonymous. "FingerWorks—Guide to Hand Gestures for USB Touchpads," obtained from http://www.fingerworks.com/igesture_userguide.html, generated Aug. 27, 2004, 1-pg.
Anonymous. "FingerWorks—iGesture—Technical Details," obtained from http://www.fingerworks.com/igesture_tech.html, generated Aug. 27, 2004, 1-pg.
Anonymous. "FingerWorks—The Only Touchpads with Ergonomic Full-Hand Resting and Relaxation!" obtained from http://www.fingerworks.com/resting.html, Copyright 2001, 1-pg.
Anonymous. "FingerWorks—Tips for Typing on the Mini," obtained from http://www.fingerworks.com/mini_typing.html, generated on Aug. 27, 2004, 2-pgs.
Anonymous. "GlidePoint®" obtained from http://www.cirque.com/technology/technology_gp.html generated Aug. 5, 2005.
Anonymous. "How do touchscreen monitors know where you're touching?" obtained from http://www.electronics.howstuffworks.com/question716.html generated Aug. 5, 2005.
Anonymous. "How does a touchscreen work?" obtained from http://www.touchscreens.com/intro-anatomy.html generated Aug. 5, 2005.

(56) References Cited

OTHER PUBLICATIONS

Anonymous. "iGesture Pad—the MultiFinger USB TouchPad with Whole-Hand Gestures," obtained from http://www.fingerworks.com/igesture.html, generated Aug. 27, 2004, 2-pgs.
Anonymous. "iGesture Products for Everyone (learn in minutes) Product Overview" FingerWorks.com downloaded Aug. 30, 2005.
Anonymous. "Infrared Touchscreens" obtained from http://www.touchscreens.com/intro-touchtypes-infrared.html generated Aug. 5, 2005.
Anonymous. "Lunar Screen Magnifier and Lunar Plus Enhanced Screen Magnifier," www.dolphincomputeraccess.com/products/lunar.htm, downloaded Oct. 25, 2005.
Anonymous. "Mouse Emulation" FingerWorks obtained from http://www.fingerworks.com/gesture_guide_mouse.html generated Aug. 30, 2005.
Anonymous. "Mouse Gestures in Opera" obtained from http://www.opera.com/products/desktop/mouse/index.dml generated Aug. 30, 2005.
Anonymous. "Mouse Gestures," Optim oz, May 21, 2004.
Anonymous. "MultiTouch Overview" FingerWorks obtained from http://www.fingerworks.com/multoverview.html generated Aug. 30, 2005.
Anonymous. "Near Field Imaging Touchscreens" obtained from http://www.touchscreens.com/intro-touchtypes-nfi.html generated Aug. 5, 2005.
Anonymous. "PenTouch Capacitive Touchscreens" obtained from http://www.touchscreens.com/intro-touchtypes-pentouch.html generated Aug. 5, 2005.
Anonymous. "Surface Acoustic Wave Touchscreens" obtained from http://www.touchscreens.com/intro-touchtypes-saw.html generated Aug. 5, 2005.
Anonymous. "Symbol Commander" obtained from http://www.sensiva.com/symbolcommander/, generated Aug. 30, 2005.
Anonymous. "Touchscreen Technology Choices," http://www.elotouch.com/products/detech2.asp, downloaded Aug. 5, 2005.
Anonymous. "Visual Disabilities," http://depts.stcc.edu/ods/ACCESS/bpvisual.htm, downloaded Oct. 25, 2005.
Anonymous. "Wacom Components—Technology" obtained from http://www.wacom-components.com/english/tech.asp generated on Oct. 10, 2004.
Anonymous. "Watershed Algorithm" http://rsb.info.nih.gov/ij/plugins/watershed.html generated Aug. 5, 2005.
Bier et al., "Toolglass and Magic Lenses: The see-through interface" In James Kijiya, editor, Computer Graphics (SIGGRAPH '93 Proceedings), vol. 27, pp. 73-80, Aug. 1993.
Chen et al. "Flowfield and Beyond: Applying Pressure-Sensitive Multi-Point Touchpad Interaction," *Multimedia and Expo, 2003, ICME '03, Proceedings*, Jul. 9, 2003, pp. 1-49, 152.
Chinese Search Report dated Apr. 20, 2017, for CN Application No. 201280007164.6, with English translation, four pages.
CNET News.com, "Reinventing the Scroll Wheel," Photo 1, downloaded from the Internet at: http://news.com.com/2300-1041_3-6107951-1.html?tag=ne.gall.pg, Aug. 22, 2006, 2 pages.
CNET News.com, "Reinventing the Scroll Wheel," Photo 2, downloaded from the Internet at: http://news.com.com/2300-1041_3-6107951-2.html?tag=ne.gall.pg, Aug. 22, 2006, 2 pages.
CNET News.com, "Reinventing the Scroll Wheel," Photo 3, downloaded from the Internet at: http://news.com.com/2300-1041_3-6107951-3.html?tag=ne.gall.pg, Aug. 22, 2006, 2 pages.
CNET News.com, "Reinventing the Scroll Wheel," Photo 4, downloaded from the Internet at: http://news.com.com/2300-1041_3-6107951-4.html?tag=ne.gall.pg, Aug. 22, 2006, 2 pages.
CNET News.com, "Reinventing the Scroll Wheel," Photo 5, downloaded from the Internet at: http://news.com.com/2300-1041_3-6107951-5.html?tag=ne.gall.pg, Aug. 22, 2006, 2 pages.
CNET News.com, "Reinventing the Scroll Wheel," Photo 6, downloaded from the Internet at: http://news.com.com/2300-1041_3-6107951-6.html?tag=ne.gall.pg, Aug. 22, 2006, 2 pages.
CNET News.com, "Reinventing the Scroll Wheel," Photo 7, downloaded from the Internet at: http://news.com.com/2300-1041_3-6107951-7.html?tag=ne.gall.pg, Aug. 22, 2006, 2 pages.
CNET News.com, "Reinventing the Scroll Wheel," Photo 8, downloaded from the Internet at: http://news.com.com/2300-1041_3-6107951-8.html?tag=ne.gall.pg, Aug. 22, 2006, 2 pages.
Douglas et al., *The Ergonomics of Computer Pointing Devices* (1997).
EVB Elektronik "TSOP6238 IR Receiver Modules for Infrared Remote Control Systems" dated Jan. 2004 1-pg.
Fisher et al., "Repetitive Motion Disorders: The Design of Optimal Rate—Rest Profiles," Human Factors, 35(2):283-304 (Jun. 1993).
Fukumoto and Yoshinobu Tonomura, "Body Coupled Fingering: Wireless Wearable Keyboard," *CHI97*, pp. 147-154 (Mar. 1997).
Fukumoto et al., "Active Click: Tactile Feedback for Touch Panels," In CHI 2001 Summary, pp. 121-122, 2001.
Hardy, "Fingerworks" Mar. 7, 2002; BBC World On Line.
Hillier and Gerald J. Lieberman, *Introduction to Operations Research* (1986).
Hinckley et al. "Touch-Sensing Input Devices," IN CHI '99 Proceedings, pp. 223-230, 1999.
Jacob et al., "Integrality and Separability of Input Devices," *ACM Transactions on Computer-Human Interaction*, 1:3-26 (Mar. 1994).
Kahney, L. (Mar. 8, 2004). "Pocket PCs Masquerade as IPods," available at: http://www.wired.com/gadgets/mac/news/2004/03/62543, last visited on Apr. 28, 2008, two pages. (20091.26 892).
Kennedy, "Methods and Apparatuses for Configuration Automation", U.S. Appl. No. 10/805,144, 59 pages.
Kionx "KXP84 Series Summary Data Sheet" copyright 2005,dated Oct. 21, 2005, 4-pgs.
Lee, "A Fast Multiple-Touch-Sensitive Input Device," Master's Thesis, University of Toronto (1984).
Matsushita et al., "HoloWall: Designing a Finger, Hand, Body and Object Sensitive Wall," In Proceedings of UIST '97, Oct. 1997.
Quantum Research Group "QT510 / Qwheel™ Touch Slider IC" copyright 2004-2005, 14-pgs.
Quek, "Unencumbered Gestural Interaction," *IEEE Multimedia*, 3:36-47 (Winter 1996).
Radwin, "Activation Force and Travel Effects on Overexertion in Repetitive Key Tapping," *Human Factors*, 39(1):130-140 (Mar. 1997).
Rekimoto et al., "ToolStone: Effective Use of the Physical Manipulation Vocabularies of Input Devices," In Proc. of UIST 2000, 2000.
Roos, Gina "Agilent's new proximity sensor beats the fumble-fingered competition hands down . . . literally", eeProductCenter, URL:http://www.eeproductcenter.com/showArticle.jhtml?articleID_46200544, (Sep. 1, 2004), 3 pages.
Rubine et al., "Programmable Finger-Tracking Instrument Controllers," *Computer Music Journal*, vol. 14, No. 1 (Spring 1990).
Rutledge et al., "Force-to-Motion Functions for Pointing," Human-Computer Interaction—INTERACT (1990).
Smith, R. et al. (1996). "Relating Distortion to Performance in Distortion-Oriented Displays," *Proceedings of the 6th Australian Conference on Computer-Human Interaction* (OZCHI '96), pp. 6-11.
Subatai Ahmad, "A Usable Real-Time 3D Hand Tracker," Proceedings of the 28th Asilomar Conference on Signals, Systems and Computers—Part 2 (of2), vol. 2 (Oct. 1994).
Sun Microsystems. (1992). "The Star7 PDA Prototype," located at <http://www.youtube.com/watch?v=Ahg8OBYixL0, last visited Jan. 15, 2010, seven pages.
Texas Instruments "TSC2003 / I2C Touch Screen Controller" Data Sheet SBAS 162, dated Oct. 2001, 20-pgs.
The Gadgeteer. (Jun. 6, 2003). "Apple iPod (30GB)," available at http://the-gadgeteer.com/review/apple_ipod_30gb_review, last visited Apr. 28, 2008, 19 pages. (20091.26 892).
Universal Remote Control, Inc., "Operating System with the Aurora MX-950", MX-950 Owners Manual, (2005).
Universal Remote Control, Inc., "All Complete Control Remotes Now Use Narrow Band RF", http://www.universalremote.com/corporate/pressrelease.php?press=13, (2008).
Universial Remote Control, Inc., "MX-950 (The Aurora)", www.unversalremote.com, (2005).

(56) References Cited

OTHER PUBLICATIONS

Wellner, "The Digital Desk Calculators: Tangible Manipulation on a Desk Top Display" IN ACM UIST '91 Proceedings, pp. 27-34, Nov. 1991.
Williams, "Applications for a Switched-Capacitor Instrumentation Building Block" Linear Technology Application Note 3, Jul. 1985, pp. 1-16.
Yamada et al., "A Switched-Capacitor Interface for Capacitive Pressure Sensors" IEEE Transactions on Instrumentation and Measurement, vol. 41, No. 1, Feb. 1992, pp. 81-86.
Yeh et al., "Switched Capacitor Interface Circuit for Capacitive Transducers" 1985 IEEE.
Zhai et al., "Dual Stream Input for Pointing and Scrolling," *Proceedings of CHI '97 Extended Abstracts* (1997).
Zimmerman et al., "Applying Electric Field Sensing to Human-Computer Interfaces," In CHI '85 Proceedings, pp. 280-287, 1995.
Non-Final Office Action dated Oct. 6, 2017, for U.S. Appl. No. 13/982,791, filed Jul. 31, 2013, 15 pages.
Final Office Action dated Jun. 7, 2018, for U.S. Appl. No. 13/982,791, filed Jul. 31, 2013, six pages.

\* cited by examiner

METHOD AND DEVICE FOR NAVIGATING IN A DISPLAY SCREEN AND APPARATUS COMPRISING SUCH NAVIGATION

BACKGROUND

The present invention relates to a method for navigating, via a command surface, in a display screen and in particular a display screen displaying at least one zone or one symbol. It also relates to a device and an apparatus comprising such navigation.

The field of the invention is more particularly, but non-limitatively, that of contactless human-machine interfaces.

Touch interfaces, or touch screens, are now widely used for controlling apparatus as varied as computers, mobile phones, tablets, etc.

Generally, a touch interface comprises a display screen combined with or incorporating a sensor or sensors which make it possible to determine a point or points of contact between the surface of the screen and one or more command objects such as one or more fingers or a stylus. It also comprises a software element making it possible to interpret the user's commands.

Capacitive measurement technologies are suitable for producing this type of interface.

Novel touch interfaces, known as 3D interfaces, incorporate a detection of objects at a distance before they touch the surface of the screen. These touch interfaces also make it possible to activate a command or a function previously associated with a symbol targeted by the command object, when the distance between the command object and the command surface reaches a predetermined value. Such an interface is described in the French patent application filed by the Applicant and published under the number FR 2 971 066 A1.

With this interface, it is thus possible to select, at a distance from the command surface, functions associated beforehand with a pair (displayed symbol; distance between the command object and the command surface). This interface therefore provides a useful possibility for selecting a command through a command surface, which is added to the possibility of selection by contact with a commonly used command surface.

A purpose of the present invention is to propose additional functionalities for navigating in a display screen proposing a better control of a user interface.

Another purpose of the present invention is to propose a method for navigating on a display screen making the selection of a command on a display screen easier and faster.

Another purpose of the present invention is to propose a method for navigating on a display screen making the navigation and the selection on a display screen more ergonomic for a user.

SUMMARY

At least one of these objectives is achieved with a method for navigating in a display screen via a command surface, comprising a step of measuring:

- an item of data, known as position data, relating to a position, on said command surface, targeted by a remote command object positioned facing said command surface, and
- an item of data, known as vertical distance data, relating to the distance between the at least one remote command object and said command surface, in particular in a plane perpendicular to said command surface;

characterized in that it also comprises a step, known as the control step, carrying out, as a function of said measured vertical distance:

- a movement, and/or
- an adjustment of a parameter relating to a movement;

of at least a part of a zone and/or of a symbol displayed on said display screen and chosen as a function of said targeted position.

Thus the method according to the invention makes it possible to use the distance between a command object and the command surface either to manipulate a zone and/or a symbol displayed on the screen or to adjust a parameter relating to such a manipulation, but without the command object thereby touching the command surface or the user making any selection.

Such a utilization, according to the invention, of the distance between a command object and the command surface makes it possible to make the navigation more direct and more rapid, simpler and more ergonomic compared with the current interfaces.

For example, in order to reposition an icon on a display screen with the current interfaces, it is necessary first of all to activate a movement function beforehand, in particular, with the interface used by the iPhone®, by prolonged contact with a command surface. According to another example, in order to magnify an icon (which amounts to moving only a part of the icon or moving a display zone containing the icon) with the current interfaces, it is necessary to use two command objects, which are generally two fingers, and to move them laterally with respect to each other. The present invention makes it possible to dispense with a prior step of activating a function or a use of two command objects, which makes the navigation more direct, more rapid, simpler and more ergonomic for the user.

Moreover, no interface known in the prior art makes it possible to adjust a movement parameter of an object as a function of the distance between a command object and a command surface. Thus, the invention brings a novel functionality to the current interfaces.

According to the invention, each symbol can be a symbol associated with/dedicated to a command.

Each symbol can comprise one or more other symbols, and in particular can be a set of symbols, such as a folder of symbols.

To avoid overcomplicating the description, in the rest of the application the expression "element" denotes "a zone and/or a symbol".

In a particular and in no way limitative version of the invention, by "movement" is meant a movement of the element displayed on the display screen, without such movement adding a new dimension to be displayed for said element.

Still in a particular and in no way limitative version, the movement and/or the adjustment carried out by the control step takes into account a unique pointing position of the command object and involves an element chosen with respect to this unique pointing position.

According to the invention, a movement of an element can involve only one part of the element, such that said movement consists of modifying the displayed size of said element on the display screen. In other words, in this case, the movement is a zoom of the element.

In particular, the modification of the size or the zoom of the element can be carried out such that the size of the element increases when the vertical distance decreases.

The modification of the size of the element can be carried out such that a part of the element is no longer displayed on the screen.

In a first embodiment, the control step can also comprise modifying the size of at least one element, other than the chosen element, displayed on the display screen, such that the total size of the set of the elements remains constant.

Such a modification can optionally be accompanied by a repositioning of at least one element other than the chosen element.

The modification of the size of at least one other element can be an increase in its size or a decrease in its size. In a particular embodiment example, the elements next to the chosen element can undergo a size modification in the same sense and the rest of the elements can undergo a size modification in the opposite sense with respect to the sense in which the size modification is carried out on the chosen element.

In particular, the control step can comprise a modification of the size of all the other elements displayed on the display screen, optionally accompanied by a repositioning of at least one of them, such that all the elements remain displayed on the display screen.

Moreover, the control step can comprise a modification of the size of a set comprising the chosen element and at least one other element, such that the size of said at least one other element remains constant during the modification of the size of the chosen element.

Such a modification can optionally be accompanied by a repositioning of at least one element other than the chosen element.

The modification of the size of the set can be an increase of its size or a decrease of its size, and in particular corresponds to a modification in the same sense as the sense in which the modification is carried out on the size of the chosen element.

The set can be the one comprising all the elements represented on the display screen. In this case, as a function of the measured vertical distance, some of the elements initially displayed on the display screen can disappear from or reappear on the display screen during the modification of the size of the chosen element, which implies a repositioning of these elements.

Advantageously, when an element the size of which is modified comprises at least one zone, known as a sub-zone, and/or at least one symbol, known as a sub-symbol, the control step can also comprise a modification of the size of said at least one sub-zone and/or sub-symbol.

In this case, the modification of the size of the at least one sub-zone and/or sub-symbol is carried out in the same sense as the modification of the size of the element which comprises it.

According to the invention, the movement can involve all the points of the chosen at least one zone and/or symbol such that the set of the at least one zone and/or symbol is moved laterally on the display screen in a predetermined direction.

In particular, the repositioning can be carried out such that the zone or the symbol moves away from the position targeted by the command object when the vertical distance decreases.

Thus, it is possible to have a sensitivity for the movement of an object on the display screen that is variable as a function of the distance between the command object and the command surface.

For example, an amount/speed/acceleration of rotation or repositioning of a symbol can be adjusted as a function of the distance between the command object and the command surface. Such a symbol can, non-imitatively, be a linear or rotary cursor for selecting the value of a parameter such as volume, display contrast, date, time, etc.

According to the invention, the parameter relating to the movement adjusted as a function of the vertical distance can comprise at least one of the following parameters:

an amount of lateral movement or rotation, on the display screen, of/in the at least one zone and/or symbol, for a given distance of lateral movement or rotation of the command object in a plane parallel to the command surface; and a speed of lateral movement or rotation, on the display screen, of/in the at least one zone and/or symbol, for a given speed of lateral movement or speed of rotation of the command object in a plane parallel to the command surface; and/or an acceleration of lateral movement or rotation, on the display screen, of/in the at least one zone and/or symbol, for a given acceleration of lateral movement or acceleration of rotation of the command object in a plane parallel to the command surface.

In other words, for two different vertical distances, the amount/speed/acceleration of lateral movement or rotation of/in the chosen element can be different for one and the same increment size of lateral movement or rotation of the command object.

In particular, the adjustment can be carried out such that, for one and the same distance of lateral movement (or one and the same rotation) of the command object, the amount/speed/acceleration of lateral movement (or rotation) increases when the vertical distance decreases.

The lateral movement or rotation, the amount/speed/acceleration of which is adjusted as a function of the vertical distance, can be a movement or a rotation in the same sense as or in the opposite sense to the lateral movement of the command object.

Advantageously, the adjustment, as a function of the measured vertical distance, of the parameter relating to the movement on the display screen can be carried out via a multiplier factor, also called a "lever arm", which is adjusted as a function of the measured vertical distance. The use of this multiplier factor can be such that the value of the parameter relating to the movement on the display screen is obtained by multiplying the measured value of the parameter for the command object by the adjusted value of the multiplier factor as a function of the measured vertical distance, namely:

(Value of parameter of movement on the screen)= (measured Value of parameter for the command object)×(Value of multiplier factor)$_{adjusted\ as\ a\ function\ of\ the\ vertical\ distance}$ In the case of a particular embodiment example, the chosen symbol can be a list comprising at least two symbols, and the adjusted parameter comprises the speed and/or the acceleration and/or a lateral distance of scrolling/unrolling of said list.

In particular, the adjustment can be carried out such that the value of the adjusted parameter increases when the vertical distance decreases.

According to an advantageous feature of the method according to the invention, the control step can be initiated when the vertical distance is less than or equal to a predetermined value, known as the start value.

The method according to the invention can also comprise activation of the display produced by the display screen when the vertical distance reaches the start value or a predetermined value, known as the display value, greater than said start value. In this case, one or more repetitions of the measurement and control steps can be carried out on a displayed element following said activation.

The control step can be frozen/stopped when the vertical distance is less than or equal to a predetermined value, known as the freeze value. Thus, the display is frozen to allow an easier selection for the user.

The method according to the invention can also comprise a step of selecting an element by bringing the command object into contact with the command surface, said selection initiating the execution of a command associated with said element.

Alternatively, the selection can be carried out when the vertical distance is less than or equal to a predetermined value, known as the selection value, which can be equal to the stop value or less than the stop value.

A selection step can be carried out after a control step, or one or more repetitions of the measurement and control steps. In this case the selection is carried out on a previously moved element or an element for which a movement parameter was adjusted during the control step.

A selection step can alternatively or additionally be carried out before a control step. In this case, one or more repetitions of the measurement and control steps can be carried out on a displayed element following said selection.

The method according to the invention can advantageously comprise a continuous repetition of the measurement and control steps.

In other words, the measurement and control steps are carried out continuously at a given frequency, for example greater than or equal to the display frequency of the display screen.

Alternatively, the measurement step can be repeated continuously at a given frequency, for example greater than or equal to the display frequency, and the control step can be repeated discretely, i.e. when the variation of the vertical distance measured during the measurement step is greater than or equal to a predetermined value. Such discrete repetition of the control step makes it possible to reduce the computation resources and the energy consumed.

The measurement of at least one item of distance data, and/or of at least one item of position data, can comprise at least:
  one measurement of capacitive interactions between the command object and at least one sensor, and
  one measurement of variations of light intensity due to the presence of the command object.

According to another aspect of the invention a device is proposed for navigating, via a command surface, in a display screen, comprising at least one measurement means arranged to determine:
  an item of data, known as position data, relating to a position, on said command surface, targeted by a remote command object positioned facing said command surface, and
  an item of data, known as vertical distance data, relating to the distance between the at least one remote command object and said command surface, in particular in a plane perpendicular to said command surface;
said device also comprising at least one means, known as the control means, configured to adjust, as a function of said item of distance data,
  a movement, and/or
  an adjustment of a parameter relating to the movement;
of at least a part of a zone and/or of a symbol displayed on said display screen and chosen as a function of said targeted position.

The control means can be an electronic or computer calculation module, constituted by an algorithm or a computer program or also a series of instructions, and executed by a processor, an FPGA or more generally by an integrated circuit.

The measurement means can comprise at least one capacitive sensor, and/or at least one optical sensor.

Advantageously, the measurement means can comprise a set of capacitive sensors combined with at least one optical sensor, of the camera type. Such a combination makes it possible to better detect and measure the position of the command object because the optical sensor is particularly effective when the command object is far away from the command surface, i.e. at a distance greater than 3 to 10 cm depending on the size of the command object, and the capacitive sensors are particularly effective when the command object is close to the command surface, i.e. at a distance of less than 3 to 10 cm depending on the size of the command object. Thus, a combination of these two types of sensors makes it possible to better manage the detection and the measurement of the distance between the command object and the command surface whatever the vertical distance.

The device according to the invention can also comprise a command surface.

Such a command surface can be transparent.

Such a touch surface can be incorporated in or arranged under/on/in a display screen, known as a touch screen.

According to a particular embodiment example, such a touch surface can be a touchpad or a graphics tablet.

According to yet another aspect of the invention an apparatus is proposed which comprises a display screen for displaying a plurality of symbols, and:
  a device according to the invention, or
  means arranged to carry out all the steps of the method according to the invention;
for navigating in said display screen.

According to a preferred embodiment, the display screen can be arranged under a transparent command surface comprising/incorporating at least one measurement means.

Such an apparatus can be a display screen, in particular a touch screen display, a computer, a telephone, a smartphone, a tablet, a terminal, or any other apparatus comprising means for interacting with a user using a pointing or command or also selection object.

BRIEF DESCRIPTION OF THE DRAWINGS

Other advantages and characteristics will become apparent on examination of the detailed description of examples that are in no way limitative and the attached drawings in which.

DETAILED DESCRIPTION

It is well understood that the embodiments that will be described hereinafter are in no way limitative. Variants of the invention can in particular be envisaged comprising only a selection of the features described below in isolation from the other described features, if this selection of features is sufficient to confer a technical advantage or to differentiate the invention with respect to the prior art. This selection comprises at least one preferably functional feature without structural details, or with only a part of the structural details if this part alone is sufficient to confer a technical advantage or to differentiate the invention with respect to the prior art.

In particular, all the described variants and embodiments can be combined if there is no objection to this combination from a technical point of view.

In the figures, the elements common to several figures retain the same references.

An embodiment of the invention will be described which utilizes capacitive sensors. Of course, this embodiment is an example, in no way limitative, for implementing the invention suitable for producing a human-machine interface (HMI) for a host system such as a mobile phone, a smartphone, a tablet or a computer.

Figure 1:
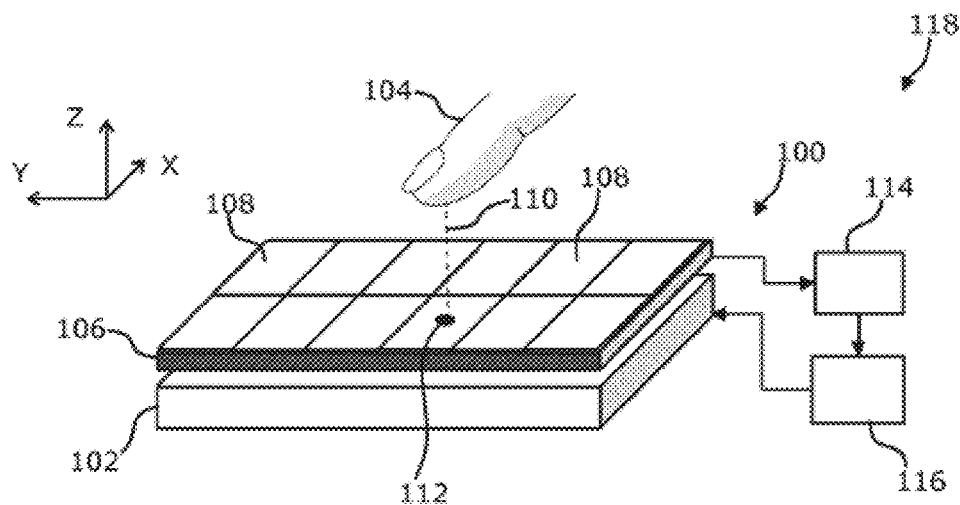
FIG. 1 is a diagrammatic representation of an example of the device according to the invention.

FIG. 1 is a diagrammatic representation of an example of the device according to the invention for navigating in a display screen.

The device 100 represented in FIG. 1 makes it possible to navigate in a display screen 102 with a command object 104.

The display screen 102 can be based, for example, on liquid crystal technology, LCD, TFT (thin-film transistor), or OLED (organic light-emitting diode).

The command object 104, in the example represented in FIG. 1, is a finger of a user. The command object can alternatively be a hand of a user or a stylus.

The device 100 comprises a command surface 106 that is substantially transparent and flat. The command surface 106 is arranged on the display screen 102 and allows visual access to the display screen 102 by being transparent. In the example represented in FIG. 1, the display surface is a surface that is independent of the display screen 102. Alternatively, the command surface 106 can be the display screen 102 or a surface of the display screen 102.

The device 100 also comprises capacitive sensors 108, likewise substantially transparent and capable of detecting the presence of the command object 104. The capacitive sensors 108 are arranged on the command surface 106 in the example represented in FIG. 1. Alternatively, the capacitive sensors can be incorporated in the command surface 106 or directly in the display screen 102.

The sensors 108 can comprise capacitive electrodes based on ITO (indium tin oxide). Depending on the applications, they can vary in terms of number and arrangement, FIG. 1 being merely for the purposes of illustration.

The capacitive sensors 108 provide on the one hand items of information relating to the distance along the Z-axis between the command object 104 and the command surface 106, indicated by the dotted line 110, and on the other hand items of information relating to the position in the plane (X, Y) of a projection along the Z-axis of the command object 104 onto the command surface 106, indicated by the dot 112. The capacitive sensors 108 are also capable of detecting a contact between the command object 104 and the command surface 106.

The device 100 also comprises an electronic measurement module 114, connected to the capacitive sensors 108, which makes it possible to determine the distance 110 and the position 112 as a function of the signals provided by the capacitive sensors 108. The items of data relating to the distance 110 and to the position 112 comprise equivalent distance 110 and position 112 measurements. These measurements, not necessarily expressed in units of length, are translations of measurements of capacitances or variations of capacitances. In particular, physical characteristics of the command object 104 can affect the measured capacitances and therefore their translation in terms of equivalent distance and/or positions.

The items of data relating to the distance 110 and to the position 112 can also comprise trajectories, defined as time sequences of distances 110 and/or positions 112, and derived values such as speeds and accelerations.

In a preferred embodiment, the sensors 108 and the electronic measurement module 114 are produced according to the methods described in the document FR 2 971 066 A1.

The device 100 according to the invention can also comprise a control module 116, present for example in the form of a microprocessor or CPU (for "Central Processing Unit") associated with components such as random-access memories (RAM), mass storage means (hard disk, flash memory, etc.), and making it possible to execute one (or a plurality of) computer or software program(s). This control module 116 is connected to the measurement module 114. The control module 116 is configured:

as a function of the position 112: to choose a zone or a symbol targeted by the command object 104 on the display screen;

as a function of the distance 110: to move the chosen zone or symbol or to adjust a parameter relating to the movement of the chosen zone or symbol; and optionally to move at least one other element displayed by the display screen, in particular the rest of the elements displayed on the display screen.

The control module 116 can be incorporated in a processor of an apparatus producing, among other things, a display on the display screen 102, i.e. a processor generating the image or the images to be displayed. Such an apparatus can be a computer, a tablet, a smartphone, a telephone, a PDA, etc.

The control module 116 can alternatively be present in the form of a processor in its own right working with the processor of such an apparatus.

The device 100 with the display screen 102 constitutes a non-limitative example of an apparatus 118 according to the invention which can be a tablet or a smartphone with touch command.

Figure 2:
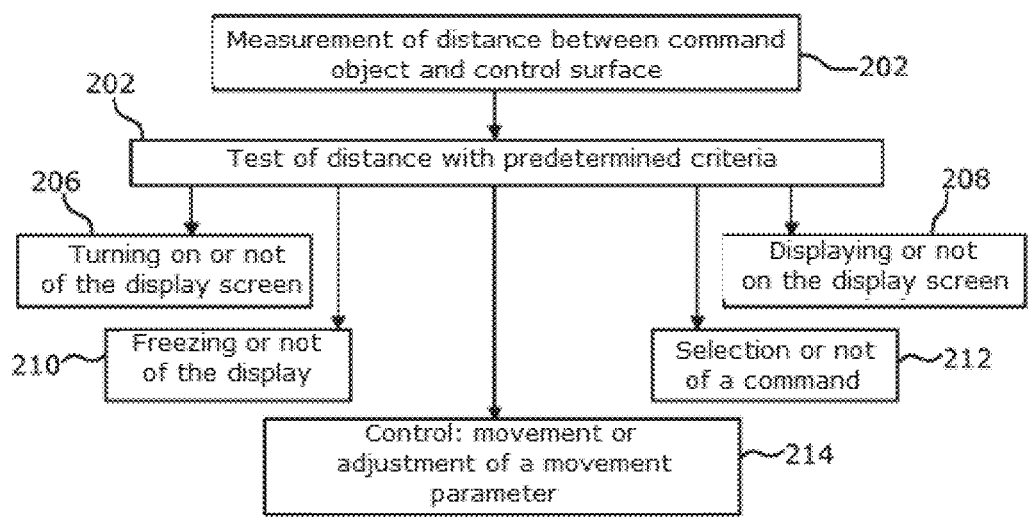
FIG. 2 is a diagrammatic representation of an example of the method according to the invention.

FIG. 2 is a diagrammatic representation of an example of a method according to the invention for navigating in a display screen.

The method 200 comprises a step 202 of measuring the vertical distance between the command surface and the command object, for example the distance 110, and optionally the position targeted by the command object, for example the position 112.

During a step 204, the measured distance 110 is compared with predetermined threshold values.

Steps 202 and 204 are carried out either continuously at a predetermined frequency or at a frequency modulated as a function of the measured distance.

During step 204, the following comparisons are carried out.

The measured distance 110 is compared with a value, known as the turn-on value, to decide whether or not to turn on the display screen. As a function of this comparison, if required, a step 206 carries out the turning on or turning off of the display screen.

The measured distance 110 is compared with a value, known as the display value, to decide whether or not to display at least one symbol on the display screen. As a function of this comparison, if required, a step 208 does or does not produce the display of at least one element on the display screen.

The measured distance 110 is compared with a value, known as the freeze value, to decide if the produced display has to be frozen or locked with a view for example to carrying out a selection of whether or not to display at least one symbol on the display screen. As a function of this comparison, if required, a step 210 freezes, or does not freeze, the display produced on the display screen as it is.

The measured distance 110 is compared with a value, known as the selection value, to decide if the command object carries out, or does not carry out, a selection of a command associated with a symbol. As a function of this comparison, if required, a step 212 activates the carrying out of the selected command. The selection value can be a zero value. In this case, the selection is carried out by bringing the command object into contact with the command surface.

Finally, the measured distance 110 is tested to determine if it is comprised between a value, known as the start value, and the stop value in order to determine if a control step has to be carried out. If the measured distance is comprised between these two values, then a control step 212 is carried out in order to move an element displayed on the display screen or to adjust a parameter relating to the movement of an element displayed on the screen, such an element being chosen as a function of the position targeted by the command object.

When, during step 204, several abovementioned criteria are satisfied, i.e. when the measured distance satisfies several of the abovementioned threshold values, then several of the steps 206-214 can be carried out in turn or at the same time.

Non-limitative examples will now be described of movement or adjustment of a parameter relating to the movement of a displayed element as a function of the vertical distance according to the invention. In the following examples, it is understood, to simplify the description, that the command surface corresponds to the surface of the display screen.

Figure 3:
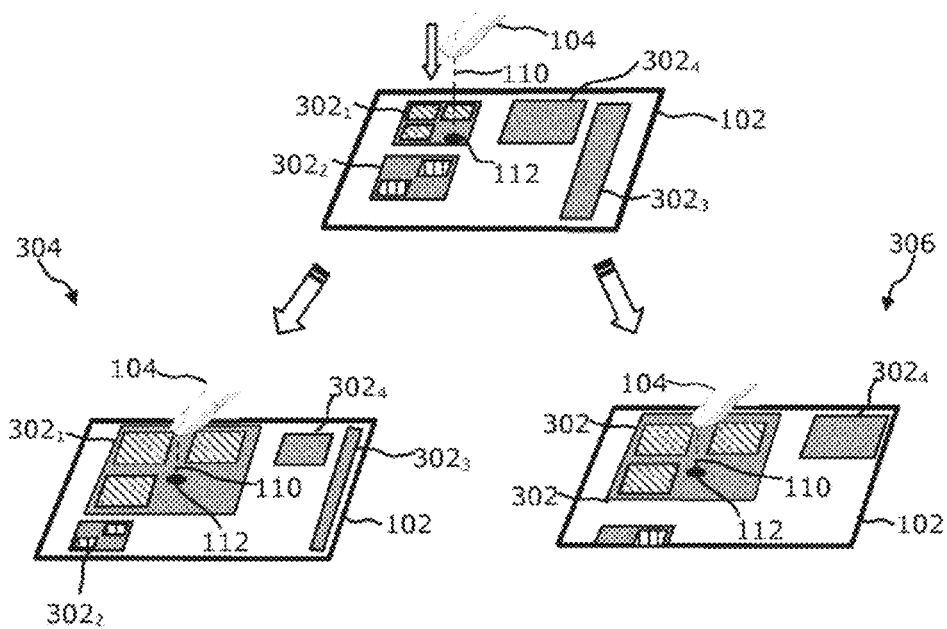
FIGS. 3-6 are diagrammatic representations of four non-limitative examples of navigation in a display screen according to the invention.

FIG. 3 is a diagrammatic representation of a first example of movement of an element displayed on the display screen as a function of the vertical distance according to the invention.

The example represented in FIG. 3 corresponds more particularly to the modification of the size of a symbol displayed on the display screen, for example the display screen 102 of FIG. 1, as a function of the vertical distance 110.

The display screen displays four symbols $302_1$-$302_4$. Each symbol $302_1$ comprises one or more symbols, known as sub-symbols.

As a function of the position 110 of the command object 104, the symbol $302_1$ or a zone around the position 110 is chosen.

When the command object 104 moves closer to the display screen, the size of the symbol $302_1$ or the zone around the position 110 is magnified or zoomed, as represented in cases 304 and 306, which correspond to two ways of carrying out such a magnification.

In case 304, when the symbol $302_1$ or the zone around the position 110 is magnified, the size of the other displayed symbols or zones is decreased such that all the symbols 302 remain displayed in the display screen.

In case 306, when the symbol $302_1$ or the zone around the position 110 is magnified, the size of the other displayed symbols or zones is kept constant such that the symbol $302_2$ is partially displayed on the display screen and the symbol $302_3$ is no longer displayed in the display screen.

In the two cases 304 and 306, during the magnification of the symbol $302_1$, one of the other displayed symbols or zones can be repositioned entirely.

Moreover, in the example represented in FIG. 3, when the symbol $302_1$ is magnified then the sub-symbols that the symbol $302_1$ contains are also magnified. This processing is optional and it is possible for the sub-symbols not to be magnified.

Of course, when the finger moves away from the display screen, the size of the symbol or symbols or of the zone previously magnified is decreased in a bijective manner and the other displayed elements are magnified and repositioned likewise in a bijective manner.

When the command object changes position in the plane of the display screen, then the processing which has just been described is applied, continuously, to another symbol or to another zone relative to each new position targeted by the command object.

Figure 4:
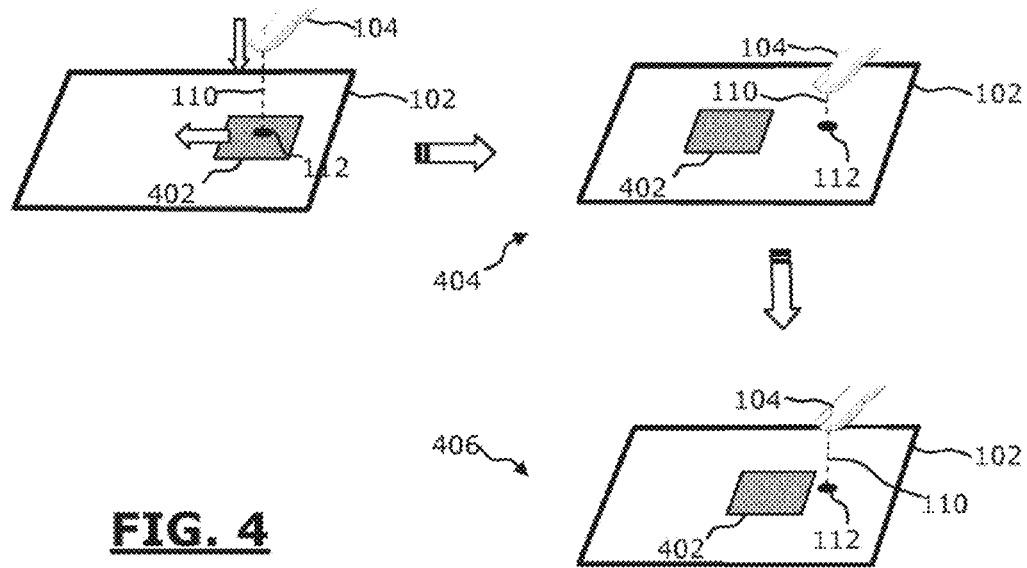

FIG. 4 is a diagrammatic representation of a second example of movement of an element displayed on the display screen as a function of the vertical distance according to the invention.

The example represented in FIG. 4 corresponds more particularly to the repositioning of a symbol 402 displayed on the display screen, for example the display screen 102 of FIG. 1, as a function of the vertical distance 110.

In the configuration 404, the position 112 of the command object 104 is used to choose the symbol 402.

When the command object 104 moves closer to the screen 102, i.e. when the distance 110 decreases, the symbol 402 is moved away from the initial position 112 in a predetermined direction and sense, as represented in the configuration 404.

When, afterwards, the command object 104 moves away from the screen 102, i.e. when the distance 110 increases, the symbol 402 moves closer to the initial position 112, being moved in the opposite direction and sense, as represented in the configuration 406.

Figure 5:
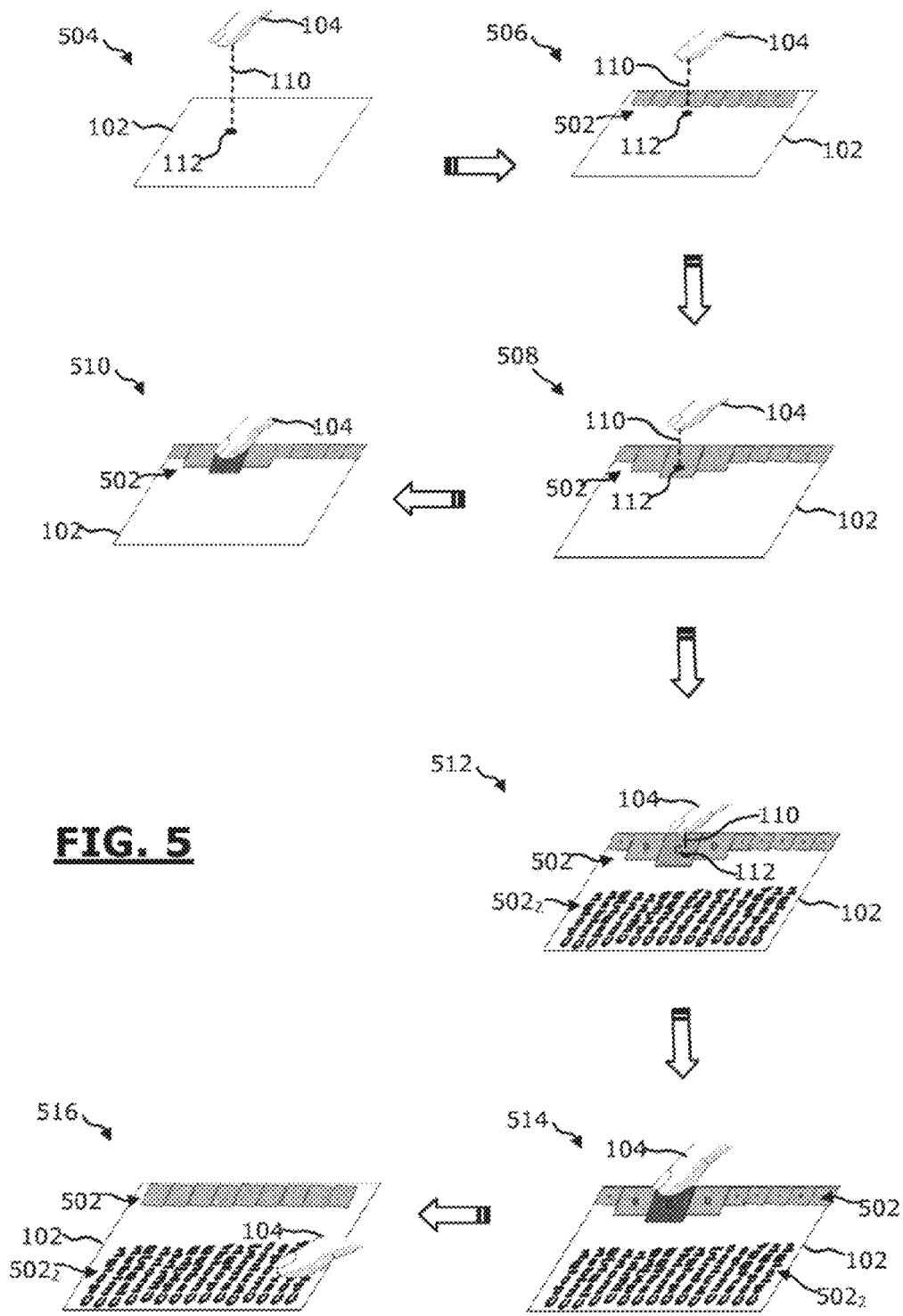

FIG. 5 is a diagrammatic representation of a third example of movement of an element displayed on the display screen as a function of the vertical distance according to the invention.

The example represented in FIG. 5 corresponds more particularly to the manipulation of a list 502 of symbols, displayed on an edge of a display screen, for example the display screen 102 of FIG. 1, as a function of the vertical distance 110.

In the configuration 504, the command object 104 moves closer to the surface of the screen 102.

As represented on the configuration 506, when the distance 110 between the command object 104 and the screen 102 is less than or equal to a predetermined distance, known as the display distance, the list 502 of symbols is displayed on the screen 102.

When the command object 104 continues to move closer to the display screen 102, a part of the list 502 chosen as a function of the position 112 targeted by the command object 104 is magnified, as represented in the configuration 508. More particularly, the size of symbols next to the position 112 targeted by the command object 104 is increased and the size of the symbols furthest away from the position 112 is decreased. Some of the symbols of the list 502 are also repositioned so as to keep the whole of the list displayed on the display screen. The modification of the size of the different symbols is a function of the distance 110 between the command object and the surface of the display screen 102. In other words, the size of the different symbols of the list of symbols 502 is adjusted as a function of the distance 110.

In a first variant, represented in the configuration 510, when, afterwards, the command object 104 touches the screen or the distance 110 between the command object 104 and the screen 102 is less than or equal to a predetermined distance, known as the selection distance, a symbol is selected from the list 502 of symbols.

In a second variant, represented in the configuration 512, the command object 104 continues to move closer to the screen 102. As a function of the targeted position 112, and when the distance 110 exceeds a predetermined value, one of the symbols of the list 502 of symbols is chosen, namely the symbol "C". The chosen symbol can be indicated by a change in colour or by any other means. The choice of a symbol from the list 502 of the symbols activates the display of another list $502_2$ corresponding to the content of the symbol, such as for example a list of names starting with the letter C. This other list $502_2$ can be displayed at another edge of the display screen 102, for example the opposite edge. The choice of a symbol results in the display produced on the screen 102 being frozen.

The configuration 512 is then followed by a configuration 514 representing the selection of the previously chosen symbol, as described above with reference to the configuration 510.

After the selection of a symbol, for example by bringing the command object 104 into contact with the screen 102, the user has the possibility of navigating in the second list $502_2$, as represented in the configuration 516.

Figure 6:
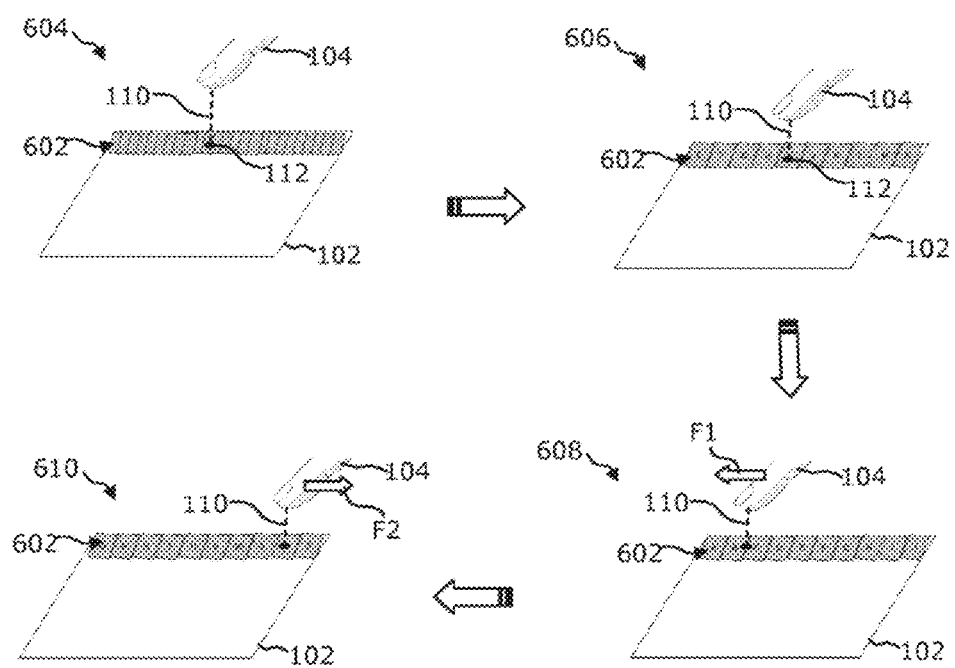

FIG. 6 is a diagrammatic representation of a fourth example of movement of an element displayed on the display screen as a function of the vertical distance according to the invention.

The example represented in FIG. 6 corresponds more particularly to the manipulation of a list 602 of symbols, displayed on an edge of a display screen, for example the display screen 102 of FIG. 1, as a function of the vertical distance 110. As represented in the configuration 604, the list 602 comprises a large number of small symbols which are difficult to select with the command object 104.

When the command object 104 moves closer to the screen, i.e. the distance 110 decreases, the list 602 is zoomed around the position 112 of the command object 104 such that only a part of the list is displayed on the screen 102. The result obtained is shown in the configuration 606. The zoom carried out is a function of the distance 110 between the command object 104 and the surface of the screen 102.

When the command object 104 is moved in a first sense indicated by the arrow F1 represented in the configuration 608, the list always scrolls in the same sense as the command object 104, while still remaining zoomed.

When the command object 104 is moved in an opposite sense indicated by the arrow F2 represented in the configuration 610, the list scrolls in the same sense as the command object 104, while still remaining zoomed.

The amount and/or speed of scrolling of the list 602 on the display screen, for a distance of lateral movement of the command object, is adjusted as a function of the distance 110 between the command object 104 and the screen 102. More precisely, the smaller the distance 110, the higher the speed/amount of scrolling of the list 602 on the display screen, and vice versa.

In another embodiment, which is not represented, the invention makes it possible to adjust the amount/speed of scrolling of a list of symbols or the rotation of a symbol or also the repositioning of a symbol but without the size of the symbol or of the list being modified as a function of the distance between a command object and the command surface. In this case, the distance between the command object and the command surface is used to adjust the amount/speed concerned and the list or the symbol is manipulated by the lateral movement of the command object in the plane of the command surface.

For example, according to the invention, it is possible to adjust the amount of scrolling on the screen of a list of symbols as a function of the distance between the command object or the command surface, but without thereby modifying the size of this element. In this case, several movement amounts chosen/adjusted as a function of the distance between the command object and the command surface correspond to a given increment size of movement of the command object in the plane of the command surface.

This example can be applied to a speed of rotation or to a repositioning speed of a symbol, which can for example be a linear or rotary cursor.

Of course, the invention is not limited to the examples which have just been described and numerous adjustments can be made to these examples without exceeding the scope of the invention.

The invention claimed is:

1. A method for navigating in a display screen via a command surface, comprising:

displaying a first list including a plurality of symbols on the display screen;

measuring position data relating to a position on said command surface targeted by at least one remote command object positioned proximate to said command surface;

measuring vertical distance data relating to a distance between the at least one remote command object and said command surface;

magnifying two or more symbols of the plurality of symbols by a same variable magnification as a function of said measured vertical distance, the two or more symbols of the plurality of symbols including at least a first symbol corresponding to a first targeted position;

changing position of other symbols of the plurality of symbols such that one or more of the other symbols moves off of the display screen;

after magnifying the two or more symbols and changing the position of the other symbols, measuring a change in position data corresponding to movement of the command object across the display screen; and in response to measuring the change in position data corresponding to movement of the command object across the display screen:

in accordance with measuring the change in position data corresponding to movement of the command object across the display screen while at a first vertical distance, scrolling the first list of symbols with a first speed of scrolling or by a first amount of scrolling in accordance with the change in the position data, and in accordance with measuring the change in the position data corresponding to the movement of the command object across the display screen while at a second vertical distance, scrolling the first list of symbols with a second speed of scrolling different from the first speed of scrolling or by a second amount of scrolling different from the first amount of scrolling in accordance with the change in the position data.

2. The method of claim 1, wherein changing the position of the other symbols of the plurality of symbols comprises varying one or more of a speed, acceleration, and lateral movement of the other symbols as a function of said measured vertical distance.

3. The method of claim 1, further comprising:
magnifying the two or more symbols when the vertical distance is less than or equal to a predetermined start value.

4. The method of claim 1, wherein the variable magnification of the two or more symbols and the changing of the position of the one or more symbols of the plurality of symbols is stopped when the vertical distance is less than or equal to a predetermined freeze value.

5. The method of claim 1, further comprising repeating the measurement of the position data and the vertical distance data, and repeating the variable magnification of the two or more symbols.

6. The method of claim 1, further comprising selecting a symbol by bringing the command object into contact with the command surface, said selection initiating the execution of a command associated with said symbol.

7. The method of claim 1, wherein the measurement of the vertical distance data and the position data comprises:
a measurement of capacitive interactions between the command object and at least one sensor.

8. The method of claim 1, further comprising:
displaying the first list in response to measuring that the distance between the at least one remote command object and said command surface meets a first vertical distance threshold.

9. The method of claim 1, further comprising:
selecting a symbol by bringing the command object within a selection distance of the command surface; and
displaying a second list in response to selecting the symbol.

10. The method of claim 9, wherein the selected symbol corresponds to a character and the second list includes a plurality of words beginning with the selected symbol.

11. The method of claim 9, wherein the first list is displayed along a first edge of the display screen and the second list is displayed along a second edge, opposite the first edge, of the display screen.

12. The method of claim 9, further comprising:
continue displaying the first list and the second list while the command object navigates from above the first targeted position corresponding to the first list to above a second targeted position corresponding to the second list; and
selecting a symbol in the second list by bringing the command object into contact with the command surface or by bringing the command object within a second selection distance of the command surface, said selection initiating the execution of a command associated with said symbol in the second list.

13. The method of claim 1, further comprising:
in accordance with measuring the change in position data corresponding to movement of the command object across the display screen in a first direction from above the first targeted position to above a second targeted position corresponding to the first list, scrolling the first list of symbols in the first direction such that at least one of the one or more other symbols that moved off the display screen moves back onto the display screen and at least one of the plurality of symbols on the display screen moves off the display screen.

14. The method of claim 13, further comprising:
in accordance with measuring the change in position data corresponding to movement of the command object across the display screen in a second direction from above the second targeted position to above the first targeted position, scrolling the first list of symbols in the second direction such that the at least one of the one or more other symbols that moved off the display screen moves back onto the display screen and the at least one of the plurality of symbols on the display screen moves off the display screen.

15. A device for navigating via a command surface in a display screen, comprising:
measurement circuitry arranged to determine
position data relating to a position on said command surface targeted by at least one remote command object positioned proximate to said command surface, and
vertical distance data relating to a distance between the at least one remote command object and said command surface; and
control circuitry configured to:
magnify two or more symbols of a plurality of symbols in a first list displayed on the display screen by a same variable magnifications as a function of the vertical distance data, the two or more symbols of the plurality of symbols including at least a first symbol corresponding to a first targeted position;
change position of other symbols of the plurality of symbols such that one or more of the other symbols moves off of the display screen;
after magnifying the two or more symbols and changing the position of the other symbols, measure a change in position data corresponding to movement of the command object across the display screen; and
in response to measuring the change in position data corresponding to movement of the command object across the display screen:
in accordance with measuring the change in position data corresponding to movement of the command object across the display screen while at a first vertical distance, scroll the first list of symbols with a first speed of scrolling or by a first amount of scrolling in accordance with the change in the position data; and
in accordance with measuring the change in the position data corresponding to the movement of the command object across the display screen while at a second vertical distance, scroll the first list of symbols with a second speed of scrolling different from the first speed of scrolling or by a second amount of scrolling different from the first amount of scrolling in accordance with the change in the position data.

16. The device of claim 15, wherein the measurement circuitry comprises at least one of:
at least one capacitive sensor, and
at least one optical sensor.

17. The device of claim 15, further comprising the command surface.

18. The device of claim 15, wherein the display screen is arranged under the command surface, wherein the command surface is transparent and incorporates the measurement circuitry.

19. The device of claim 18, wherein the device is incorporated into one of a computer, a telephone, a smartphone, a tablet and a terminal.

20. The device of claim 15, wherein the device is incorporated into one of a computer, a telephone, a smartphone, a tablet and a terminal.

21. The device of claim 15, wherein the control circuitry is further configured to:
    magnify the two or more symbols when the vertical distance is less than or equal to a predetermined start value.

22. The device of claim 15, wherein the control circuitry is further configured to:
    stop the variable magnification of the two or more symbols and the changing of the position of the one or more symbols of the plurality of symbols when the vertical distance is less than or equal to a predetermined freeze value.

23. The device of claim 15, wherein the control circuitry is further configured to:
    select a symbol by bringing the command object within a selection distance of the command surface; and
    display a second list in response to selecting the symbol.

24. The device of claim 15, wherein the control circuitry is further configured to:
    in accordance with measuring the change in position data corresponding to movement of the command object across the display screen in a first direction from above the first targeted position to above a second targeted position corresponding to the first list, scroll the first list of symbols in the first direction such that at least one of the one or more other symbols that moved off the display screen moves back onto the display screen and at least one of the plurality of symbols on the display screen moves off the display screen.

25. The device of claim 24, wherein the control circuitry is further configured to:
    in accordance with measuring the change in position data corresponding to movement of the command object across the display screen in a second direction from above the first targeted position to above the second targeted position, scroll the first list of symbols in the second direction such that the at least one of the one or more other symbols that moved off the display screen moves back onto the display screen and the at least one of the plurality of symbols on the display screen moves off the display screen.

* * * * *